United States Patent Office 3,767,662
Patented Oct. 23, 1973

3,767,662
CERTAIN 1,3-THIAZOLIDIN-4-ONES
Ian Trevor Kay, Wokingham, England, assignor to Imperial Chemical Industries Limited, London, England
No Drawing. Filed Aug. 9, 1971, Ser. No. 170,367
Claims priority, application Great Britain, Aug. 17, 1970, 39,484/70
Int. Cl. C07d 91/16
U.S. Cl. 260—306.7                                    3 Claims

ABSTRACT OF THE DISCLOSURE

Certain 5-carbamoyl oxides of thiazolidin-4-one compounds, their synthesis, and their use as insecticides and arachnidicides.

---

This invention relates to new organic compounds, to compositions containing them, and to methods of controlling pests using them. More particularly the invention relates to new carbamoyloximes, to pesticidal compositions containing them, and to methods of controlling insect and arachnid pests using them.

Accordingly the present invention provides new compounds having the general formula:

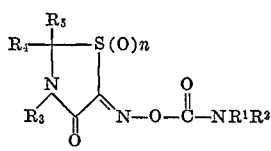

wherein $R^1$ and $R^2$ represent atoms of hydrogen or hydrocarbyl groups, or together with the adjacent nitrogen atom a heterocyclic radical which may comprise one or more other heteroatoms; $R^3$, $R^4$ and $R^5$ represent hydrogen atoms or hydrocarbyl groups, or any two of $R^3$, $R^4$ and $R^5$, may be linked to form a bridging group which may comprise one or more heteroatoms; or $R^4$ and $R^5$ may represent halogen atoms, or nitro, cyano, or amino groups; and $n$ has the value zero, 1 or 2.

It is to be understood that the term "hydrocarbyl groups" as used hereinabove is intended to include both substituted and unsubstituted hydrocarbyl groups.

Preferred compounds provided by the present invention are those wherein $n$ is zero, and $R^1$ to $R^5$ are hydrogen atoms or lower alkyl or alkenyl groups, that is to say alkyl, or alkenyl groups containing from 1 to 6 carbon atoms, and preferably from 1 to 4 carbon atoms.

Specific compounds within the scope of the invention are listed in Table I below and these compounds correspond to the structural formula:

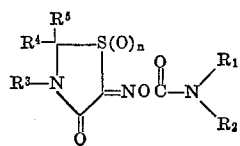

TABLE I

| Compound number | $R_1$ | $R_2$ | $R_3$ | $R_4$ | $R_5$ | $n$ | M.P., degrees centigrade |
|---|---|---|---|---|---|---|---|
| 1 | Me | H | Me | Me | Me | 0 | 145-6 |
| 2 | Me | H | Me | Me | Pr$^i$ | 0 | [1] 99-102 |
| 3 | Me | H | Me | Me | Et | 0 | 100-102 |
| 4 | Me | Me | Me | Me | Et | 0 | 112-3 |
| 5 | Me | Me | Me | Me | Pr$^i$ | 0 | 134-5 |
| 6 | Me | H | Me | Et | Et | 0 | 131-2 |
| 7 | Me | H | Me | Me | Pr$^i$ | 1 | 145-146 |
| 8 | Me | Me | Me | —(CH$_2$)$_5$— | | 0 | 183-4 |
| 9 | Me | H | Me | —(CH$_2$)$_6$— | | 0 | 161-162 |
| 10 | Me | H | Me | Me | Pr$^n$ | 0 | 96-97 |
| 11 | Me | Me | Me | Me | Pr$^n$ | 0 | 68-69 |
| 12 | Me | H | Me | Me | Et | 1 | 82-84 |
| 13 | Me | Me | Me | Et | Et | 0 | 149-150 |
| 14 | Et | H | Me | Et | Et | 0 | 96-97 |
| 15 | Pr$^n$ | H | Me | Et | Et | 0 | Oil |
| 16 | Me | H | Me | Me | Bu$^i$ | 0 | 85-86 |
| 17 | Me | H | Me | H | Pr$^i$ | 0 | 131 |
| 18 | Me | Me | Me | Me | Bu$^i$ | 0 | 108-109 |
| 19 | Me | H | Et | Me | Et | 0 | 110-111 |
| 20 | Me | Me | Et | Me | Et | 0 | 60 |
| 21 | Et | H | Me | M | Bu$^i$ | 0 | 70-72 |
| 22 | Me | H | Me | H | H | 0 | 169-170 |
| 23 | Me | H | Me | Me | C$_6$H$_{13}$$^n$ | 0 | Oil |
| 24 | Me | Me | Me | Me | C$_6$H$_{13}$$^n$ | 0 | Oil |
| 25 | Me | H | Pr$^n$ | Me | Et | 0 | 55-58 |
| 26 | Me | H | Et | Et | Et | 0 | 98-99 |
| 27 | Me | Me | Et | Et | Et | 0 | 83-84 |
| 28 | Me | H | Me | Me | H | 0 | 91-92 |
| 29 | Me | H | Me | Et | H | 0 | 127-129 |
| 30 | Me | H | Et | H | H | 0 | 110-111 |
| 31 | Me | H | Et | Me | Me | 0 | 160-164 |
| 32 | Me | H | Me | Me | Bu$^i$ | 0 | 137-138 |

[1] Glass.

All the compounds gave satisfactory elemental analysis. In the above table:

H signifies a hydrogen atom
Me signifies a methyl radical, i.e. —CH$_3$
Et signifies an ethyl radical, i.e. —C$_2$H$_5$
Pr signifies a propyl radical, i.e. —C$_3$H$_7$
Bu signifies a butyl radical, i.e. —C$_4$H$_9$
the suffix t signifies a tertiary radical
the suffix i signifies a iso radical
the suffix n signifies a normal radical.

An especially useful compound within the invention is that having the structural formula:

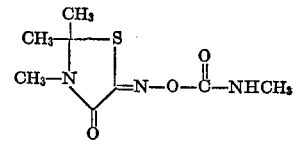

The invention compounds may be prepared by reacting the appropriate 1,3-thiazolidin-4-one with an alkyl nitrite to produce an oxime of the formula:

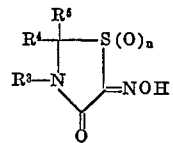

wherein $R^3$, $R^4$, $R^5$ and $n$ have any of the meanings stated above, which may be carbamoylated either by (i) reacting the oxime with an isocyanate of the formula: $R_1NCO$ where $R_1$ has any of the meanings stated above, conveniently in the presence of a small quantity of a base and/or a solvent, or (ii) reacting the oxime, or a salt thereof, with a carbamoyl halide of formula:

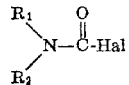

wherein $R_1$ and $R_2$ have any of the meanings stated above and Hal represents an atom of a halogen, if necessary in the presence of a base and/or a solvent.

Suitable bases for the above reactions are tertiary amines, for example triethylamine, N-methylmorpholine and pyridine. Suitable solvents are, for example, benzene, ether, light petroleum and pyridine.

The compounds of this invention or compositions as hereinafter defined are very toxic towards a variety of insect and other invertibrate pests including the following:

*Tetranychus telarius* (red spider mites—adults and eggs)
*Aphis fabae* (black aphids)
*Aedes aegypti* (mosquito larvae)
*Megoura viciae* (green aphids)
*Pieris brassicae* (white butterfly)
*Phaedon cochleariae* (mustard beetle)
*Meloidogyne incognita* (nematodes)
*Musca demestica* (housefly)
*Dysdercus fasciatus* (cotton stainer capsid)
*Calandra granaria* (grain weevil)
*Agriolimax reticulatus* (grey field slug).

A particularly useful feature of the activity of the invention compounds is their ability to act as systemic pesticides, that is to say, their ability to move in a plant to combat infestations thereon at a site remote from the site of actual application of a compound.

The invention further consists in pesticidal compositions comprising as an active ingredient a compound having the general formula:

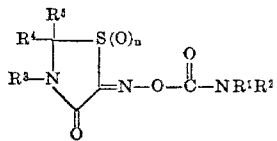

wherein $R^1$ and $R^2$ represent atoms of hydrogen or hydrocarbyl groups, or together with the adjacent nitrogen atom a heterocyclic radical which may comprise one or more other heteroatoms; $R^3$, $R^4$ and $R^5$ represent hydrogen atoms or hydrocarbyl groups, or any two of $R^3$, $R^4$ and $R^5$, may be linked to form a bridging group which may comprise one or more heteroatoms; or $R^4$ and $R^5$ may represent halogen atoms, or nitro, cyano, or amino groups; and $n$ has the value zero, 1 or 2.

In a preferred aspect the invention provides pesticidal compositions comprising a compound according to the general formula in the preceding paragraph and wherein $n$ is zero, and $R^1$ to $R^5$ are hydrogen atoms or lower alkyl or alkenyl groups.

A particularly useful composition according to the invention is one comprising the compound having the formula:

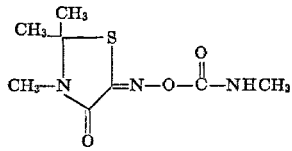

In use, the invention compounds, or compositions containing them, may be applied in a variety of ways. Thus their application can suitably be directed onto pests, the locus of pests, or to the habitat of pests.

According to a further feature therefore we provide a method of combating pests which comprises applying to the pests, to the locus of the pests, or to the habitat of the pests a carbamoyloxime compound or composition as hereinbefore defined.

The invention compounds and compositions may also be applied to plants, or to the seeds, corms, bulbs, tubers, rhizomes or other propagative parts of the plants.

In a further aspect, therefore, the invention provides a method of treating plants to render them less susceptible to damage by pests which comprises treating the plants, or seeds, corms, bulbs, tubers, rhizomes or other propagative parts of the plants with a carbamoyloxime compound or composition as hereinbefore defined. The invention further includes a method of treating agricultural soil comprising applying to the soil a carbamoyloxime compound or a composition as hereinbefore defined.

The compounds and compositions of the invention may be used for agricultural or horticultural purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example, kaolinite (china clay), montmorillonite, attapulgite, talc, pumice, silica, calcium carbonate, gypsum, powdered magnesia, fuller's earth, Hewitt's earth and diatomaceous earth. Compositions for dressing seed, for example, may comprise an agent assisting the adhesion of the composition to the seed, for example, a mineral oil.

The composition may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredients in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example, cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzene-sulphonate, sodium, calcium or ammonium lignosulphonate, butylnaphthalene sulphonate, and a mixture of the sodium salts of diisopropyl- and triisopropyl-naphthalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, the lecithins, and block copolymers of ethylene oxide and propylene oxide.

Suitable suspending agents are, for example, bentonite, pyrogenic silica, and hydrophilic colloids, for example polyvinylpyrrolidone and sodium carboxymethyl-cellulose, and the vegetable gums, for example gum acacia and gum tragacanth.

The aqueous solutions dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compounds of the invention may also be formulated into compositions comprising capsules or microcapsules containing either the active ingredient itself, or a composition containing the active ingredient, and prepared by any of the known encapsulation or microencapsulation techniques.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example, for improving the distribution, adhesive powder and resistance to rain on treated surfaces, the different compositions can be better adapted for the various uses for which they are intended.

The compounds of this invention may also be conveniently formulated by admixing them with fertilizers. A preferred composition of this type comprises granules of fertilizer material incorporating, for example coated with, a compound of this invention. The fertilizer material may, for example, comprise nitrogen or phosphate-containing substances.

In a yet further aspect of the invention, therefore, we provide a fertilizer comprising a compound of the invention as hereinbefore defined.

The compositions which are to be used in the form of aqueous dispersions or emulsions are generally supplied in the form of a concentrate containing a high proportion of the active ingredient or ingredients, the said concentrate to be diluted with water before use.

These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients. When diluted to form aqueous preparations, such preparations may contain varying amounts of the active ingredient or ingredients depending upon the purpose for which they are to be used, but an aqueous preparation containing between 0.001% and 1.0% by weight of active ingredient or ingredients may be used.

It is to be understood that the pesticidal compositions of this invention may comprise, in addition to a compound of the invention, one or more other compounds having biological activity.

The invention is illustrated, but not limited, by the following examples.

EXAMPLE 1

This example illustrates the preparation of 2,2,3-trimethyl-1,3-thiazolidin-4-one, having the formula:

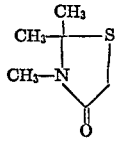

A mixture of acetone (121.0 g.), thioglycollic acid (94.2 g.), methylammonium carbonate (75.0 g.) and benzene (1,200 ml.) was heated under reflux with stirring for 20 hours using a water separator. The benzene solution was then washed with water, dried over anhydrous magnesium sulphate and evaporated. Distillation of the residual oil gave the product as a pale yellow oil, B.P. 58–62/0.03 mm., $n_D^{22}$ 1.5142.

EXAMPLE 2

This example illustrates the preparation of 5-oximino-2,2,3-trimethyl-1,3-thiazolidin-4-one, having the formula:

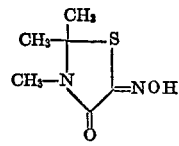

To a suspension of sodium hydride (1.34 g.; 50% dispersion in oil) in anhydrous benzene (25 ml.) was added with stirring isopropyl nitrite (1.35 g.) and 2,2,3-trimethyl-1,3-thiazolidin-4-one (2.0 g.). The mixture was heated slowly and following the vigorous reaction at 60° or so, was heated under reflux for a further 1 hour. After allowing the benzene solution to cool, water (175 ml.) was added, the organic phase separated, the aqueous phase acidified with HCl and extracted with chloroform (3 × 50 ml.) and the combined chloroform extracts dried over anhydrous magnesium sulphate. Evaporation of the chloroform, followed by crystallization of the residue from chloroform light-petroleum (B.P. 100–120°) gave the product as colourless prismatic needles, M.P. 171–172° C.

EXAMPLE 3

This example illustrates the preparation of 5-methylcarbamoyloximino - 2,2,3 - trimethyl-1,3-thiazolidin-4-one having the formula:

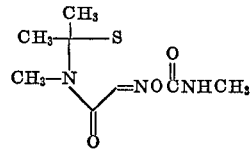

To a solution of 5-oximino-2,2,3-trimethyl-1,3-thiazolidin-4-one (1.2 g.) in chloroform (15 ml.) containing triethylamine (3 drops) was added methyl isocyanate (2 ml.), and following the mildly exothermic reaction the mixture was kept at room temperature for 2 hours. Removal of the solvents under reduced pressure followed by crystallisation of the residue from benzene gave the product as colourless prisms, M.P. 145–6° C.

Compounds Nos. 2 to 32 inclusive of Table I above were prepared by a similar process to that described above, using in each instance the appropriate starting substances.

EXAMPLE 4

This example illustrates an atomisable fluid comprising a mixture consisting of 25% by weight of compound of Example 3 and 75% by weight of xylene.

EXAMPLE 5

This example illustrates a dusting powder which may be applied directly to plants or other surfaces and comprises 1% by weight of compound of Example 3 and 99% by weight of talc.

EXAMPLE 6

25 parts by weight of the product described in Example 3, 65 parts by weight of xylene, and 10 parts of an alkyl aryl polyether alcohol ("Triton" X-100; "Triton" is a trademark) were mixed in a suitable mixer. There was thus obtained an emulsion concentrate which can be mixed with water to produce an emulsion suitable for use in agricultural applications.

EXAMPLE 7

5 parts by weight of the product described in Example 3 were thoroughly mixed in a suitable mixer with 95 parts by weight of talc. There was thus obtained a dusting powder.

EXAMPLE 8

10 parts by weight of the product described in Example 3, 10 parts of an ethylene oxide-octylphenol condensate ("Lissapol" NX; "Lissapol" is a trademark) and 80 parts by weight of diacetone alcohol were thoroughly mixed. There was thus obtained a concentrate which, on mixing with water, gave an aqueous dispersion suitable for application as a spray in the control of insect pests.

EXAMPLE 9

This example illustrates a concentrated liquid formulation in the form of an emulsion. The ingredients listed below were mixed together in the stated proportions and the whole stirred until the constituents were dispersed.

|  | Percent wt. |
| --- | --- |
| Compound of Example 3 | 20 |
| "Lubrol" L ("Lubrol" is a trademark) | 17 |
| Calcium dodecylbenzenesulphonate | 3 |
| Ethylene dichloride | 45 |
| "Aromasol" H ("Aromasol" is a trademark) | 15 |
|  | 100 |

EXAMPLE 10

The ingredients listed below were ground together in the proportions stated to produce a powdered mixture readily dispersible in liquids.

|  | Percent wt. |
| --- | --- |
| Compound of Example 3 | 50 |
| Dispersol T ("Dispersol" is a trademark) | 5 |
| China clay | 45 |
|  | 100 |

EXAMPLE 11

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

|  | Percent wt. |
| --- | --- |
| Compound of Example 3 | 50 |
| Dispersol T | 12.5 |
| Calcium lignosulphonate | 5 |
| Sodium dodecylbenzenesulphonate | 12.5 |
| Sodium acetate | 20 |
|  | 100 |

EXAMPLE 12

A composition suitable for use as a seed dressing was prepared by mixing all three of the ingredients set out below in the proportions stated.

|  | Percent wt. |
| --- | --- |
| Compound of Example 3 | 80 |
| Mineral oil | 2 |
| China clay | 18 |
|  | 100 |

EXAMPLE 13

A granular composition was prepared by dissolving the active ingredient in a solvent, spraying the solution obtained onto the granules of pumice and allowing the solvent to evaporate.

|  | Percent wt. |
| --- | --- |
| Compound of Example 3 | 5 |
| Pumice granules | 95 |
|  | 100 |

EXAMPLE 14

An aqueous dispersion formulation was prepared by mixing and grinding the ingredients recited below in the proportions stated.

|  | Percent wt. |
| --- | --- |
| Compound of Example 3 | 40 |
| Calcium lignosulphonate | 10 |
| Water | 50 |
|  | 100 |

The following constitutes an explanation of the compositions or substances represented by the various trademarks and trade names referred to in the foregoing examples.

"Lubrol" L is a condensate of 1 mole of nonyl phenol with 13 molar proportions of ethylene oxide.

"Aromasol" H is a solvent mixture of alkylbenzenes.

"Dispersol" T is a mixture of sodium sulphate and a condensate of formaldehyde with the sodium salt of naphthalene sulphonic acid.

"Lissapol" NX is a condensate of 1 mole of nonyl phenol with 8 moles of ethylene oxide.

"Triton" X–100 is an alkyl aryl polyether alcohol.

EXAMPLE 15

The toxicity of the compound of Example 3 towards a number of insect species was investigated in the following manner. Individual *Macrosiphum pisi* adults, *Dysdercus fasicatus* adults, *Musca domestica* adults and *Plutella maculipennis* larvae were treated by applying to the cuticle a droplet of volume 0.001 cc. of a composition containing 0.5 $\mu$g. of the compound of Example 3 dissolved in acetone using a microsyringe. After a few minutes the treated individuals had all died.

In a further test one leaf, or one petiole from which the leaf had been removed, of a growing cabbage plant (3 weeks old) was briefly immersed in a aqueous solution containing 1000 p.p.m. of the compound of Example 3 after which 24 hours was allowed to elapse. One of the other, i.e. untreated, leaves was then removed and larval *Pieris brassicae* were allowed to feed on it. After 24 hours all the caterpillars were observed to be dead.

In a similar test 100% mortality was also observed when the solution containing the compound of Example 3, was poured on the soil in which the cabbage plant was growing instead of treating a leaf.

EXAMPLE 16

The toxicity of compounds of this invention towards a variety of insect and other invertibrate pests was investigated and the further tests conducted and results obtained are set out below. The compounds of the invention were in each case used in the form of a liquid preparation containing 0.1% (1000 parts per million (p.p.m.)) by weight of the compound. The preparations were made by dissolving each of the compounds in a mixture of solvents consisting of 4 parts by volume of acetone and 1 part by volume of diacetone alcohol. The solutions were then diluted with water containing 0.01% by weight of a wetting agent sold under the trade name of "Lissapol" NX until the liquid preparations contained the required concentration of the compound ("Lissapol" is trademark).

In the case of the preparations used in the test against *Aedes aegypti* and *Meloidogyne incognita* these were further diluted until they contained 100 p.p.m. of the compound under test.

The test procedure adopted with regard to each test insect was basically the same and comprised supporting a number of the insects on some medium which may be a host plant or some foodstuff on which the insect feeds, and treating either or both the insect and the medium with the preparations. The mortality of the insects was then assessed at periods varying from one to three days after the treatment.

In the chemosterilant test with *Tetranychus telarius* the procedure was as follows: 3 days after spraying french bean plants infested with the pests, any living adults were removed from the plants and transferred to fresh untreated plants. After a further period of 3 days the adults were again removed, and any eggs laid on the plants transferred to transparent adhesive tape, and after a yet further period of three days the viability of the eggs was assessed.

In Table 2A below, the columns indicate, from left to right, the specific name and the common name of the species under test, the host plant or medium on which it was supported and the number of days which elapsed after treatment before assessing the mortality of the pest, or other effects, for example, if feeding had been discouraged.

The concentration of the invention compound in the solutions used was 1000 parts per million (p.p.m.) for all the pests, except in the cases of *Aedes aegypti* and *Meloidogyne incognita* when the concentration used was 100 p.p.m.

TABLE 2B

| Compound number—Table I | T.t. (A) | T.t. (E) | A.f. | M.v. | A.e. (A) | A.e. (L) | M.d. (I) | M.d. (II) | P.m. (L) | P.b. (L) | P.c. (A) | M.i. | C.g (A) |
|---|---|---|---|---|---|---|---|---|---|---|---|---|---|
| 1 | 3 | 3 | 3 | 3 | 0 | 0 | 3 | -- | 0 | 3 | 2 | 3 | 0 |
| 2 | 3 | 3 | 3 | 3 | 0 | 1 | 0 | 1 | 1 | 3 | 3 | -- | 0 |
| 3 | 3 | 3 | 3 | 3 | 0 | 2 | 1 | 0 | 2 | 3 | 2 | -- | 2 |
| 4 | 3 | 3 | 3 | 3 | 0 | -- | 0 | 0 | 0 | 3 | 2 | -- | 0 |
| 5 | 3 | 3 | 3 | 3 | 0 | -- | 0 | 0 | 0 | 0 | 0 | -- | 0 |
| 6 | 3 | 3 | 3 | 3 | 0 | -- | 0 | 0 | 0 | 3 | 3 | -- | 0 |
| 7 | 3 | -- | 0 | 0 | -- | 0 | 2 | 0 | 0 | 0 | 0 | -- | 0 |
| 8 | 3 | -- | 3 | 3 | -- | 0 | 0 | 0 | 0 | 0 | 0 | -- | 0 |
| 9 | 3 | -- | 3 | 3 | -- | 0 | 2 | 1 | 0 | 0 | 0 | -- | 0 |
| 10 | 3 | -- | 3 | 3 | -- | 3 | 0 | 0 | 0 | 3 | 1 | -- | 0 |
| 11 | 3 | -- | 3 | 3 | 0 | 3 | 0 | 0 | 0 | 0 | 0 | -- | 0 |
| 12 | 3 | -- | 0 | 0 | 0 | 0 | 0 | 0 | 0 | 0 | 0 | -- | 0 |
| 13 | 3 | 3 | 3 | 3 | 0 | 0 | 1 | 0 | 0 | 0 | 0 | -- | 0 |
| 14 | 3 | -- | 3 | 3 | 0 | 0 | 0 | 0 | 0 | 0 | 2 | -- | 0 |
| 15 | 3 | 0 | 3 | 3 | 0 | 0 | 0 | 1 | 0 | 0 | 0 | -- | 0 |
| 16 | 3 | -- | 0 | 3 | 2 | 0 | 0 | 0 | 0 | 0 | 0 | -- | 0 |
| 17 | 3 | -- | 3 | 3 | 0 | 3 | 0 | 0 | 0 | 0 | 0 | -- | 0 |
| 18 | 3 | -- | 0 | 3 | 0 | 0 | 0 | 0 | 0 | 0 | 0 | 0 | 0 |
| 19 | 3 | 3 | 3 | 3 | 0 | 0 | 0 | 0 | 0 | 0 | 3 | 0 | 0 |
| 20 | 3 | 3 | 3 | 3 | 0 | 0 | 0 | 0 | 0 | 0 | 1 | 2 | 0 |
| 21 | 3 | -- | 3 | 0 | 0 | 0 | 0 | 0 | 0 | 0 | 0 | 0 | 0 |
| 22 | 3 | -- | 3 | 3 | 0 | 0 | 3 | 0 | 0 | 3 | 3 | 0 | 0 |
| 23 | 2 | -- | 0 | 0 | 0 | 0 | 1 | 0 | 0 | 0 | 0 | -- | 0 |
| 24 | 0 | -- | 0 | 0 | 0 | 0 | 1 | 0 | 0 | 0 | 0 | -- | 0 |
| 25 | 3 | -- | 3 | 3 | 0 | 0 | 2 | 0 | 0 | 0 | 2 | -- | 0 |
| 26 | 3 | -- | 3 | 3 | 0 | 2 | 2 | 0 | 0 | -- | 2 | -- | 0 |
| 27 | 3 | -- | 3 | 3 | 0 | 0 | 2 | 0 | 0 | -- | 0 | -- | 0 |
| 28 | 3 | -- | 3 | 3 | 2 | 0 | 1 | 0 | 0 | -- | 3 | -- | 0 |
| 29 | 3 | -- | 3 | 3 | 0 | 0 | 2 | 0 | 0 | 2 | 2 | -- | 0 |
| 30 | 3 | -- | 3 | 3 | 0 | 0 | 0 | 0 | 0 | -- | 3 | -- | 0 |
| 31 | 3 | -- | 3 | 2 | 0 | 0 | 2 | 0 | 0 | -- | 2 | -- | 0 |

TABLE 2A

| Species | Common name | Support medium/food | Time interval T (days) |
|---|---|---|---|
| *Tetranychus telarius* (T.t.) A | Red spider mite (adults) | French Bean | 3 |
| *Tetranychus telarius* (T.t.) E | Red spider mite (eggs) | do | |
| *Aphis fabae* (A.f.) | Black aphid | Broad Bean | 2 |
| *Megoura viciae* (M.v.) | Green aphid | French Bean | 2 |
| *Aedes aegypti* (A.e.) | Mosquito (larva) | Water | 1 |
| *Musca domestica*[1] (M.d.) | House fly | Milk and sugar | 1 |
| *Plutella maculipennis* (P.m.) | Diamond back moth caterpillar | Mustard/paper | 2 |
| *Pieris brassicae* (P.b.) | Cabbage white caterpillar | Cabbage | 1 |
| *Phaedon cochleariae* (P.c.) | Mustard beetle | Mustard/paper | 2 |
| *Calandra granaria* (C.g.) | Grain weevil | Wheat grain | 2 |
| *Meloidogyne incognita* (M.i.) | Root knot nematode | Water | 1 |

[1] In the test against *Musca domestica* results are given for both a direct contact effect (I) and a residual effect (II).

In the tests against some species either adult (A) or larval (L) stages were used, as indicated in the Table 2B.

The actual results obtained are given in Table 2B. The assessment is expressed in integers which range from 0 to 3.

0 represents less than 30% kill
1 represents from 30–49% kill
2 represents from 50–90% kill
3 represents over 90% kill.

EXAMPLE 17

Compounds of the invention were tested for molluscicidal activity and details of the tests conducted are as follows.

A weighed sample of the compound under test was dissolved in 0.5 cc. of an ethanol and acetone mixture (50:50 v./v.). The solution was diluted with 0.5 cc. water and poured onto a calf feeding pellet in a glass petri dish and the pellet was air dried for 24 hours. The weight of compound used was chosen so that the dried pellet contained 4% by weight of the active ingredient. Two replicates each consisting of a plastic petri dish containing a pellet, 2 slugs, and a moistened filter paper to maintain a high relative humidity were used in each test. The dishes were left in the cold room (10° C.). After 6 days the kill was assessed.

The slugs used were *Agriolimax reticulatus* (Mull), and they had been starved for 24 hours before the commencement of the tests. The results of the test are as follows.

| Compound No.: | Percent kill |
|---|---|
| 1 | 100 |
| 2 | 100 |
| 3 | 100 |
| 4 | 50 |
| 5 | 100 |
| 6 | 100 |
| 9 | 50 |
| 10 | 50 |
| 11 | 50 |
| 14 | 50 |
| 16 | 100 |
| 17 | 100 |
| 20 | 50 |
| 22 | 50 |
| 23 | 50 |
| 25 | 50 |
| 26 | 50 |
| 29 | 100 |
| 30 | 50 |
| 31 | 50 |

What is claimed is:
1. A compound of the formula:

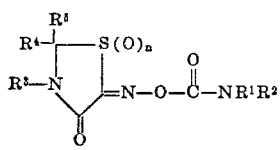

wherein $R^1$ and $R^2$ are hydrogen or alkyl or alkenyl each containing from 1 to 6 carbon atoms; $R^3$ is hydrogen or alkyl or alkenyl each containing from 1 to 6 carbon atoms; and $R^4$ and $R^5$ are hydrogen or alkyl or alkenyl each containing from 1 to 6 carbon atoms, or $R^4$ and $R^5$ are linked together to form an alkylene bridging group containing from 4 to 7 carbon atoms; and $n$ has the value zero or one.

2. A compound according to claim 1 wherein $n$ is zero and $R^1$, $R^2$, $R^3$, $R^4$ and $R^5$ are hydrogen or alkyl or alkenyl containing from 1 to 4 carbon atoms.

3. The compound according to claim 1 and having the structural formula:

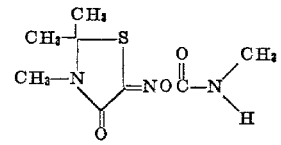

References Cited
UNITED STATES PATENTS

| | | | |
|---|---|---|---|
| 3,483,216 | 12/1969 | Woodward | 260—306.7 |
| 3,485,849 | 12/1969 | Donche et al. | 260—306.7 |
| 3,505,348 | 4/1970 | Donche et al. | 260—306.7 |
| 3,671,650 | 6/1972 | Islip | 260—306.7 |

RICHARD J. GALLAGHER, Primary Examiner

U.S. Cl. X.R.

424—270